June 18, 1929.  M. RIESNER  1,717,810

CONNECTING ROD

Filed March 16, 1927

MICHAEL RIESNER.
INVENTOR

BY

ATTORNEY

Patented June 18, 1929.

1,717,810

UNITED STATES PATENT OFFICE.

MICHAEL RIESNER, OF CINCINNATI, OHIO, ASSIGNOR TO WORTHINGTON PUMP AND MACHINERY CORPORATION, OF NEW YORK, N. Y., A CORPORATION OF VIRGINIA.

CONNECTING ROD.

Application filed March 16, 1927. Serial No. 175,711.

This invention relates to connecting rods and their bearings, and the primary object of the invention is to provide a bearing structure designed to permit ready adjustment of the bearing to compensate for wear.

The present invention comprehends the provision of a connecting rod structure which can be economically manufactured, will have the advantages of solid bushing construction, and will provide means of adjustment for taking up wear by means of shims, thereby avoiding the use of taper wedges and adjusting screws and their contingent disadvantages.

In the drawings—

Figure 1:
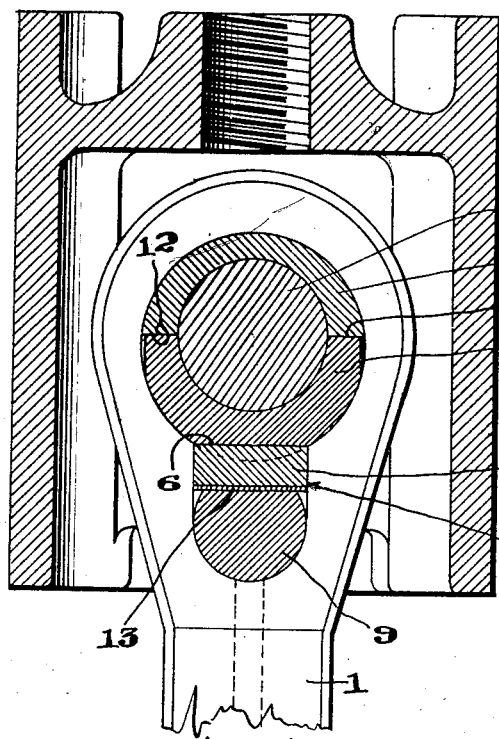
Figure 1 is a section through the connecting rod structure showing the improved bearing.
Figure 2:
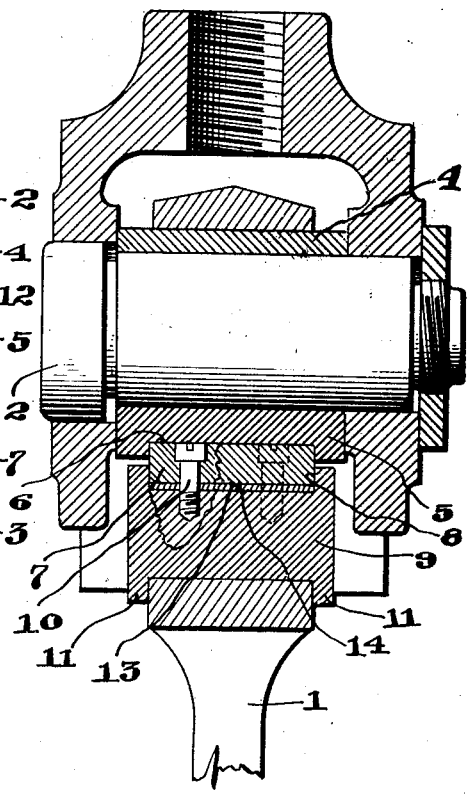
Figure 2 is a section taken at right angles to the section shown in Figure 1.
Figure 2:
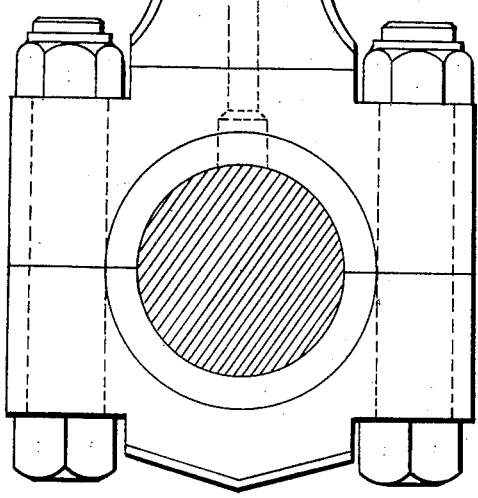
Figure 3:
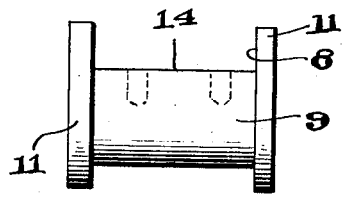
Figure 3 is a detail elevation of a pin used in the bearing structure.

Referring more particularly to the drawings, the connecting rod 1 is illustrated as connected to the wrist pin 2 by means of the improved bearing structure generically indicated by 3. The wrist pin bearing box consists of the two half sections or half boxes 4 and 5 and while in the drawings, the wrist pin receiving opening is shown eccentric of the outer surface of the box, this feature is provided merely to provide sufficient metal thickness in the section or half box 5 and it is to be understood that the wrist pin box sections 4 and 5 may be equal in size and shape and the wrist pin receiving opening therein concentric, if it is so desired, without departing from the spirit of this invention.

The section 5 of the wrist pin box structure is provided with a flattened portion 6 against which one surface of the adjusting block 7 rests. The adjusting block 7 also extends into the cut out portion 8 of the pin 9 and it is attached to the pin by countersunk screws 10. The pin 9 has flanges 11 on its ends, for providing means for maintaining the entire bearing box assembly in position. When assembling the bearings, the adjusting block 7 and the pin 9 are first put in proper position in the connecting rod 1 after which the section 5 of the wrist pin box is put in its proper position, the section 4 of the wrist pin box is then driven into the connecting rod thus providing a bearing having all of the advantages of a solid bushing construction and one which can be economically manufactured and assembled.

When it is necessary to adjust the box to take up or compensate for wear, the engaging flat surfaces 12 of the sections 4 and 5 are filed off the proper amount, depending upon the amount of wear which has taken place and a shim or shims as shown at 13 equal in thickness to the amount which has been filed or cut off the surfaces 12 is placed between the adjusting block 7 and the flat surface 14 of the pin 9.

It will be understood that the invention is not to be limited to the specific construction or arrangement of parts shown but that these may be modified widely within the invention defined by the claims.

What is claimed is:

1. In a connecting rod structure, a pin carried by the connecting rod and having flanges thereon to prevent displacement of the pin relative to the connecting rod, a wrist pin bearing box formed of a plurality of sections, an adjustment block carried by said pin, one of the sections of said bearing box being recessed to receive said adjustment block, whereby when the other section of the bearing box is driven into position all of the various parts will be maintained in their proper place.

2. In a connecting rod structure, a wrist pin bearing box including a plurality of bushing sections, an adjustment block, one of said bushing sections recessed to receive said adjusting block, a flanged pin carried by the connecting rod and engaging said block to maintain the block and bearing box sections in place.

3. In a connecting rod structure, a wrist pin bearing box formed of two sections having flat engaging surfaces adapted to be cut away to take up wear on the sections, an adjustment block engaging one of said sections, a flanged pin carried by the connecting rod for maintaining said adjustment block and bearing box sections in place, said adjustment block provided to receive shims against one surface thereof to compensate the cutting away of the engaging surfaces of the bearing box sections.

4. In a connecting rod structure, a wrist pin bearing box formed of two sections having flat engaging surfaces adapted to be cut away to take up wear on the sections, a flanged pin carried by the connecting rod for maintaining said adjustment block and bearing box sections in place, an adjustment block detachably connected to said pin and engaging one of said bearing box sections, said adjusting block and flanged pin adapted to receive shims therebetween to compensate for the metal cut away from the engaging surfaces of the bearing box sections.

5. In a connecting rod structure, a connecting rod having a wrist pin and bearing box receiving opening therein and provided with a smaller opening at one side of and engaging with said first named opening, a bearing box formed of a plurality of sections seated in said first named opening, one of said sections provided with a recess facing said smaller opening, a flanged pin in said smaller opening and having a recess therein facing the recess in the bearing block section, and an adjustment block engaging in said recesses, the flanges of said pin engaging the side of the connecting rod, whereby the entire bearing box assembly will be maintained in position.

In testimony whereof I affix my signature.

MICHAEL RIESNER.